United States Patent [19]

Henley

[11] 4,450,025
[45] May 22, 1984

[54] METHOD AND APPARATUS FOR WRAPPING A TIRE BEAD RING

[75] Inventor: Virgil E. Henley, Akron, Ohio

[73] Assignee: The General Tire & Rubber Company, Akron, Ohio

[21] Appl. No.: 462,284

[22] Filed: Jan. 31, 1983

[51] Int. Cl.³ .................. B29H 17/12; B29H 17/34
[52] U.S. Cl. ................................ 156/132; 156/460
[58] Field of Search ............ 156/131, 132, 135, 398, 156/400, 401, 422, 460

[56] References Cited

U.S. PATENT DOCUMENTS

| | | | |
|---|---|---|---|
| 1,498,532 | 6/1924 | Ambler | 156/422 |
| 2,567,064 | 9/1951 | Frazier | 156/132 |
| 2,855,976 | 10/1958 | Jeannero et al. | 156/460 |
| 2,943,668 | 7/1960 | Trevaskis et al. | 156/401 |
| 3,011,540 | 12/1961 | Vanzo et al. | 156/422 |
| 3,154,455 | 10/1964 | Nebout | 156/460 |
| 3,185,607 | 5/1965 | Nebout | 156/132 |
| 4,168,336 | 9/1979 | White et al. | 156/401 |
| 4,196,036 | 4/1980 | Allen et al. | 156/422 |

FOREIGN PATENT DOCUMENTS 525562 10/1976 U.S.S.R. ................ 156/422

*Primary Examiner*—Edward C. Kimlin
*Assistant Examiner*—F. K. Wine

[57] ABSTRACT

An apparatus and method are provided for applying an envelope-type wrapping to tire bead rings. The apparatus and method are particularly useful when the wrapping material is to be applied directly over a lubricant coating on the bead ring. The apparatus includes a radially expansible drum, and an inflatable bladder that covers the drum and is interposed, along with the wrapping material, between the bead ring and the drum. According to the method of the invention, the bladder is inflated and rolled over in a desired sequence of steps to apply an envelope wrapping to the bead ring.

1 Claim, 8 Drawing Figures

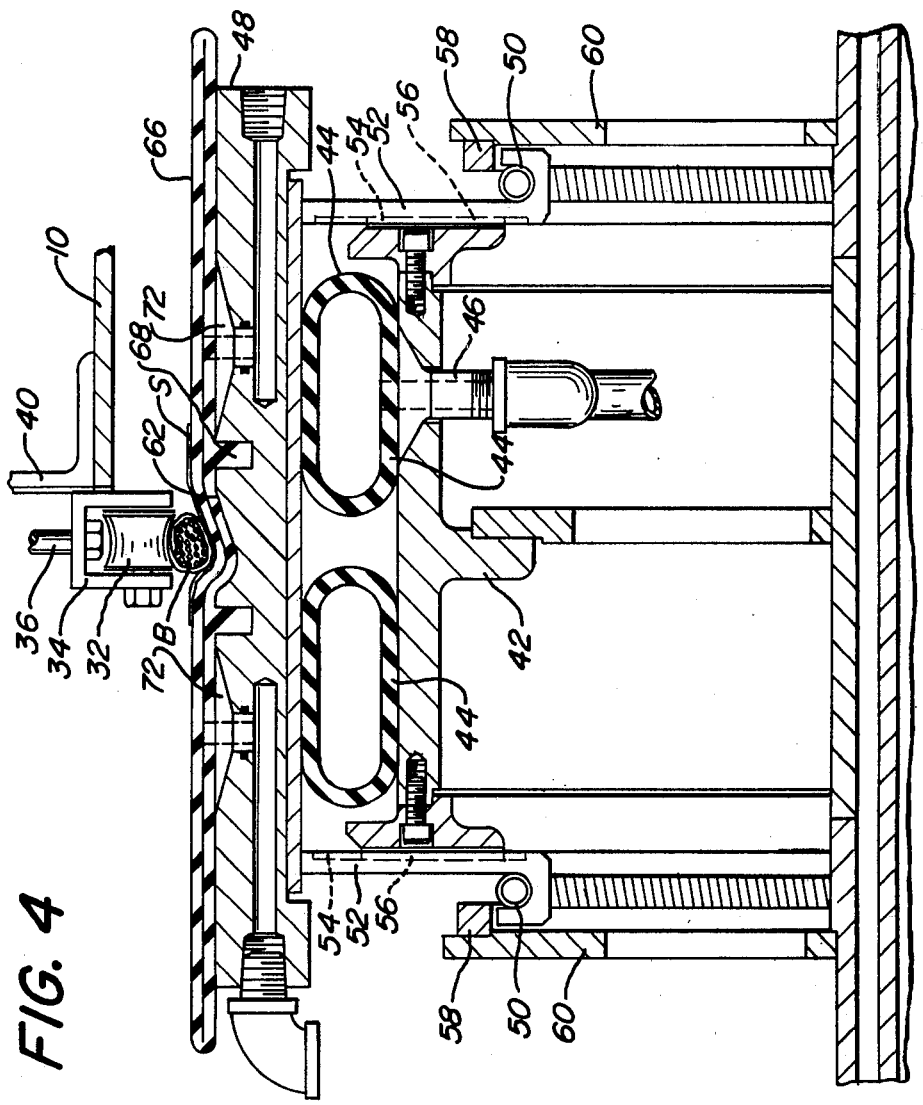

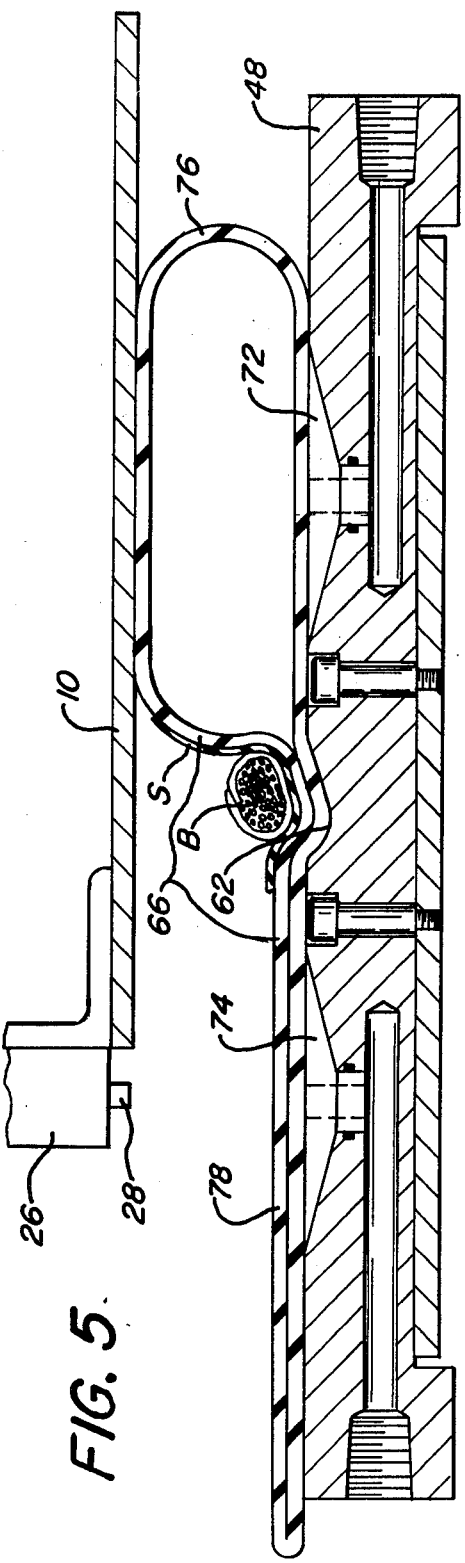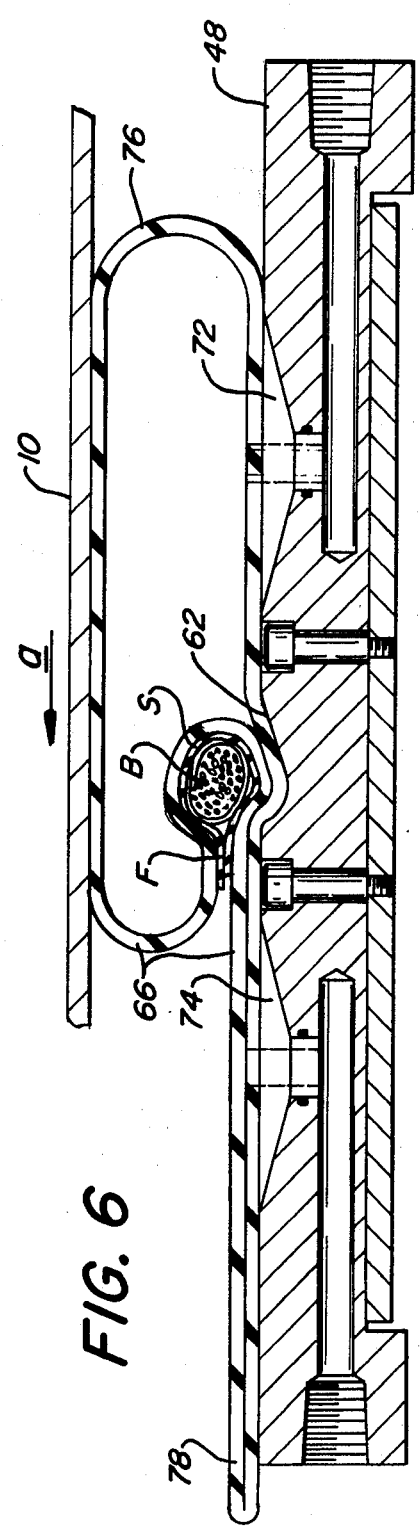

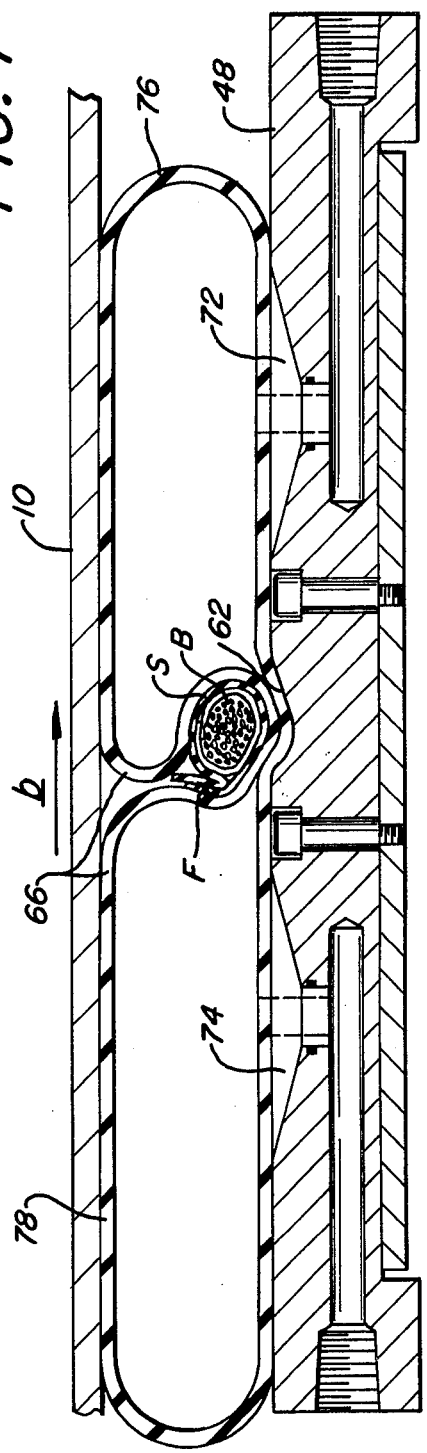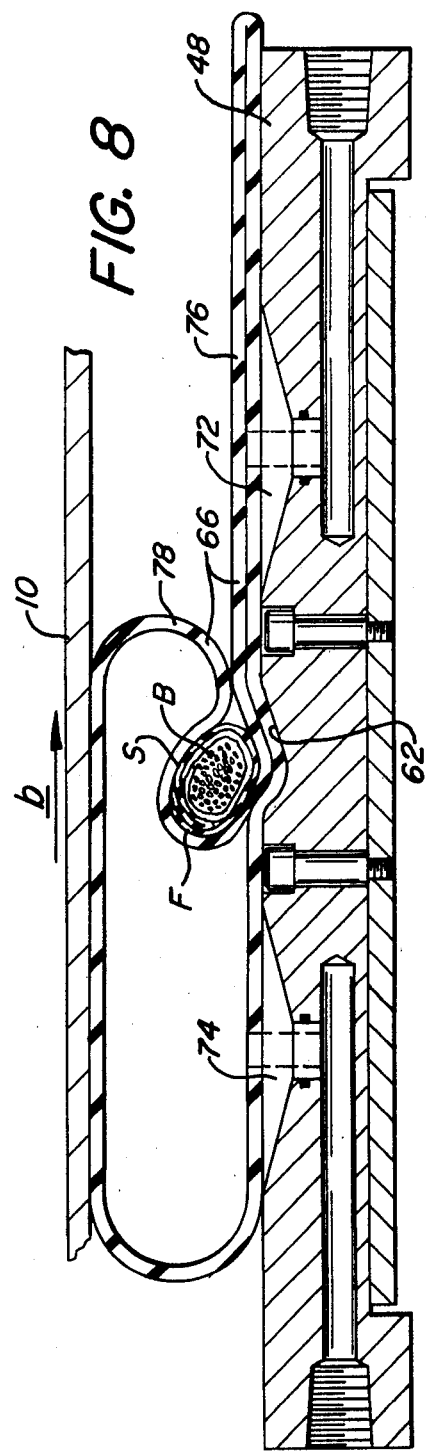

METHOD AND APPARATUS FOR WRAPPING A TIRE BEAD RING

This invention relates to the wrapping of wire bead rings to prepare them for assembly in a pneumatic tire. More particularly, the invention relates to the wrapping of bead rings with a cover made of an elastomer or a fabric impregnated with an elastomer, using the so-called "envelope" wrap construction, as opposed to the "spiral" wrap construction.

Prior to their assembly with the ends of the carcass plies, the bead rings of the tire are first covered with a wrapping applied in one of two basic forms. One is a "spiral" wrap, achieved by winding a strip of the wrapping material helically around the bundle of wires forming the bead ring, with the back edge of each helix overlapping the lead edge of the previous helix. The other wrapping is an "envelope" wrap, made by placing a strip of wrapping material on the inner circumference of the bead ring, and folding the lateral edge portions of the wrapping material radially outwardly and around the bead ring so as to envelope the ring. The edge portions of the strip are usually brought together, usually with their inwardly facing surfaces abutting one another so as to form a radially outwardly extending flipper. In cases where such a flipper is not desired, it can be folded over against the main body portion of the strip that covers the bead ring. The present invention relates to a new method and apparatus for applying this envelope type of wrap to a bead ring, as opposed to the spiral type of wrap.

Past apparatus and methods of applying envelope wrappings to bead rings have involved the use of various kinds of rigid roller-type applications; examples of which are shown in U.S. Pat. Nos. 1,463,868; 1,571,404; 1,575,925; 1,624,544; 1,871,119; 1,931,924; 2,278,533; 2,855,976; and 3,532,578. The bead rings of these patents are covered by apparatus that grips the bead ring in several locations and rotates the ring by roller friction. Meanwhile, a strip of wrapping material is fed in at some location along the circumference of the ring in contact with the radially inward-facing surface of the ring. At several circumferentially spaced locations, the strip is wrapped in a series of steps until it covers the remaining surfaces of the strip, and forms either a projecting flipper or a seam that is substantially flush with the radially outward surface of the bead ring.

While such methods and apparatus have proven satisfactory in applying envelope wrappings to unlubricated bead rings, they have not worked very well in applying such wrappings to bead rings that have first had a lubricant applied to their outer surfaces. It is sometimes desirable to coat the bead ring with a lubricant in order to reduce the distortion of the tire components adjacent the bead ring when the tire is expanded from a cylindrical to a torodial shape. U.S. Pat. No. 1,915,668 to Hoover, co-pending U.S. application Ser. No. 297,441 of Forsythe, and abandoned U.S. application Ser. No. 338,765 of DePaul and Semonin, the latter two applications being assigned to the assignee of the present invention, all describe tires having such a lubricant between their bead rings and an outer wrap in which the bead rings are encased prior to assembly with the tire carcass plies.

The main drawback in applying the conventional methods and apparatus for wrapping bead rings to the wrapping of lubricated rings is that many of the same machinery parts that hold the bead ring before it is covered also contact the ring after it is covered. With this arrangement, everything gets covered with lubricant sooner or later, including the outside surface of the bead ring after it is wrapped, and all of the machine parts that contact the ring. With the lubricant thus spread everywhere, the ring cannot be gripped firmly, and the wrapping is either applied non-uniformly or not applied at all, because the edge portions of the wrap become coated with lubricant and cannot be stitched together to form a complete envelope. The presence of the bead wrap also creates problems in setting the bead ring on the carcass plies and in wrapping the carcass ply ends around the bead ring.

An object of the present invention is to provide a novel method and apparatus for covering bead rings with an envelope wrap that will result in a uniform, high-quality wrap, and a relatively trouble-free, fast method of applying such a wrap. The method and apparatus have particular advantages in the application of coverings to lubricant-coated bead rings, but the invention can also be used in applying coverings to non-lubricated bead rings.

The present invention accomplishes the foregoing and other objects by an apparatus that includes a radially expansible drum made of a plurality of rigid, arcuate drum segments. Each segment has a recess in its outer surface and the recesses of all the segments are aligned to form a circumferentially extending recess in the outer surface of the drum. The apparatus also includes an inflatable bladder for carrying a covering strip. This bladder is mounted on the outer surface of the drum and extends over the circumferentially extending recess. Means, preferably in the form of pressurized bladders, are provided for moving the segments radially outwardly to expand the drum and receive a bead ring in the circumferentially extending recess, with the bladder and the covering strip that is carried thereon being interposed between the bead ring and the walls of the recess.

Means, preferably in the form of a pressurized air system, are also provided for inflating the bladder. Also, the apparatus includes a roll-over cylinder aligned with the drum and spaced radially outwardly therefrom and movable axially into contact with an outwardly facing wall of an inflated portion of the bladder. Finally, the roll-over cylinder is equipped with means, preferably in the form of a motor-driven screw and threaded ball-collar, for moving the cylinder axially to roll the inflated bladder portion and the covering strip carried by the inflated bladder portion over the bead ring.

The present invention is also embodied in a method of wrapping a bead ring in which a bead covering strip is placed on a deflated bladder that extends across a circumferentially extending recess in the surface of an expansible drum, so that the bead covering strip extends around the drum and the bladder and extends over the recess. Then, the drum is expanded to receive the bead ring interposed between the bead ring and the drum. Next, the bladder portion on one side of the bead ring is inflated to raise a first edge portion of the covering strip, and the outwardly facing wall of the bladder is rolled axially to carry this bladder portion over the bead ring so as to wrap the first edge portion of the strip over the radially outwardly facing side of the bead ring and into contact with the other edge portion of the strip. The other bladder portion is inflated to raise the other edge portion of the covering strip, and the outwardly facing bladder wall is rolled in the opposite direction from the direction of rolling of the first portion so that the bladder wraps both edge portions of the covering strip over the radially outwardly facing side of the bead ring.

Recesses for retaining bead rings with a bead wrapping material interposed between the bead ring and the walls of the recess are shown in U.S. Pat. Nos. 1,624,544 (FIGS. 8, 9 and 10); 1,871,119 (FIGS. 5 and 6); and 3,532,578 (FIG. 8). However such recesses are not located in the surface of an expansible drum which firmly holds the bead ring substantially throughout its circumference. Also, there is no inflatable bladder interposed between the bead ring and the walls of the recess.

Inflatable bladders and roll-over cylinders such as the inflatable bladder shown in FIGS. 25 to 27 of U.S. Pat. No. 3,475,254 and the roll-over cylinder shown in FIG. 2 of that patent have been used in connection with the assembly of bead rings with the carcass plies of a tire. However, such equipment has not been employed in handling the special problems in folding a wrapping strip about a bead ring prior to its assembly with the carcass, particularly those problems encountered in applying a covering to a lubricated bead ring.

The objects and features of the present invention will be more apparent from the following detailed description and the accompanying drawings illustrating preferred embodiments of the invention.

In the drawings,

FIGS. 3 and 4 are partial longitudinal sectional views of the bead wrapping machine of FIGS. 1 and 2, taken along line III—III of FIG. 1 and showing respectively first and second steps in the loading of a bead ring to be wrapped by the machine;

FIGS. 5 through 8 are partial longitudinal sectional views of the bead wrapping machine of FIGS. 1 and 2, taken along line V—V of FIG. 2 and showing in sequence the steps performed by the machine in wrapping a bead ring.

Figure 1:
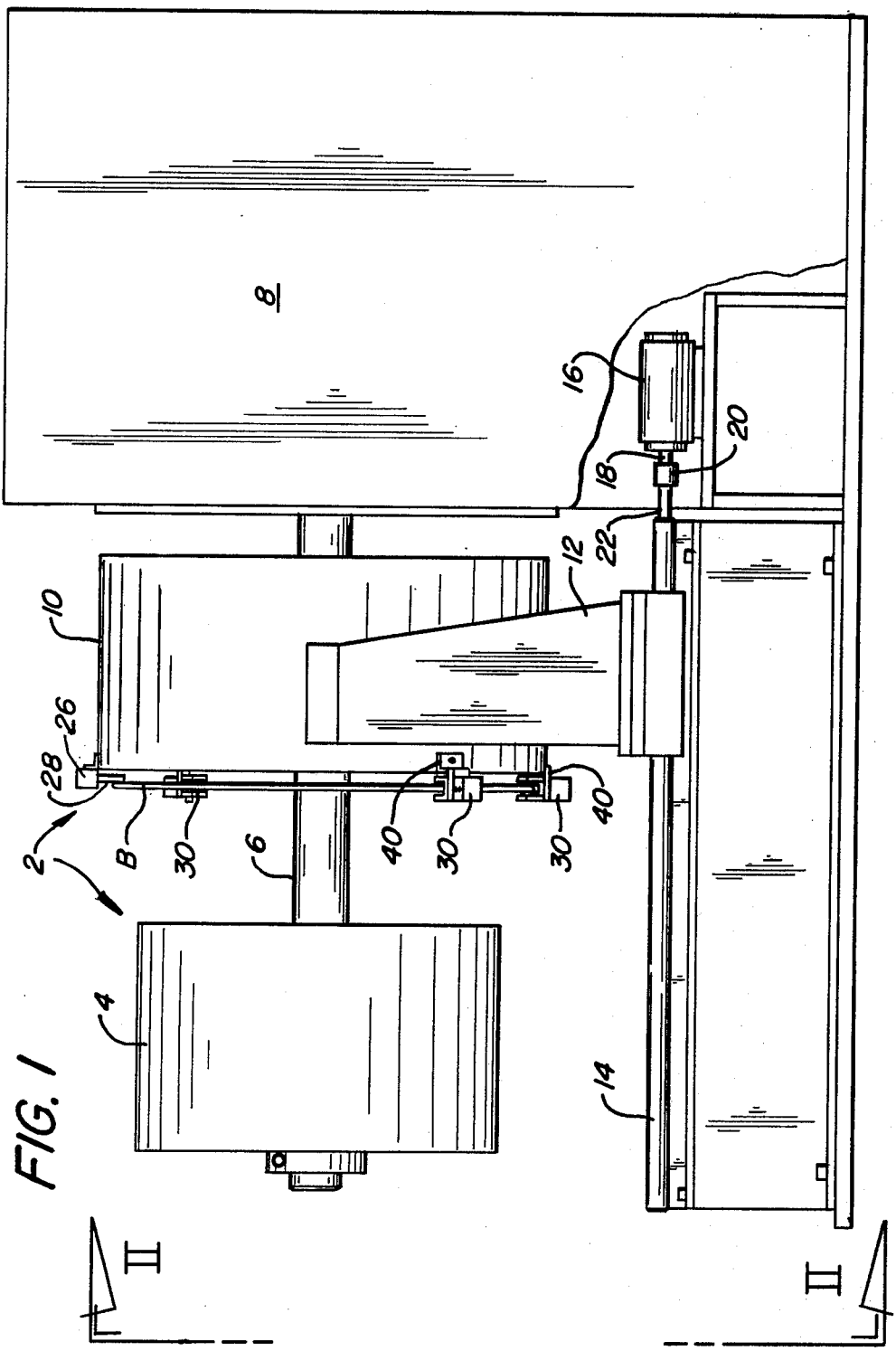
FIG. 1 is a side elevation of a bead wrapping machine, embodiment of the present invention.
Figure 2:
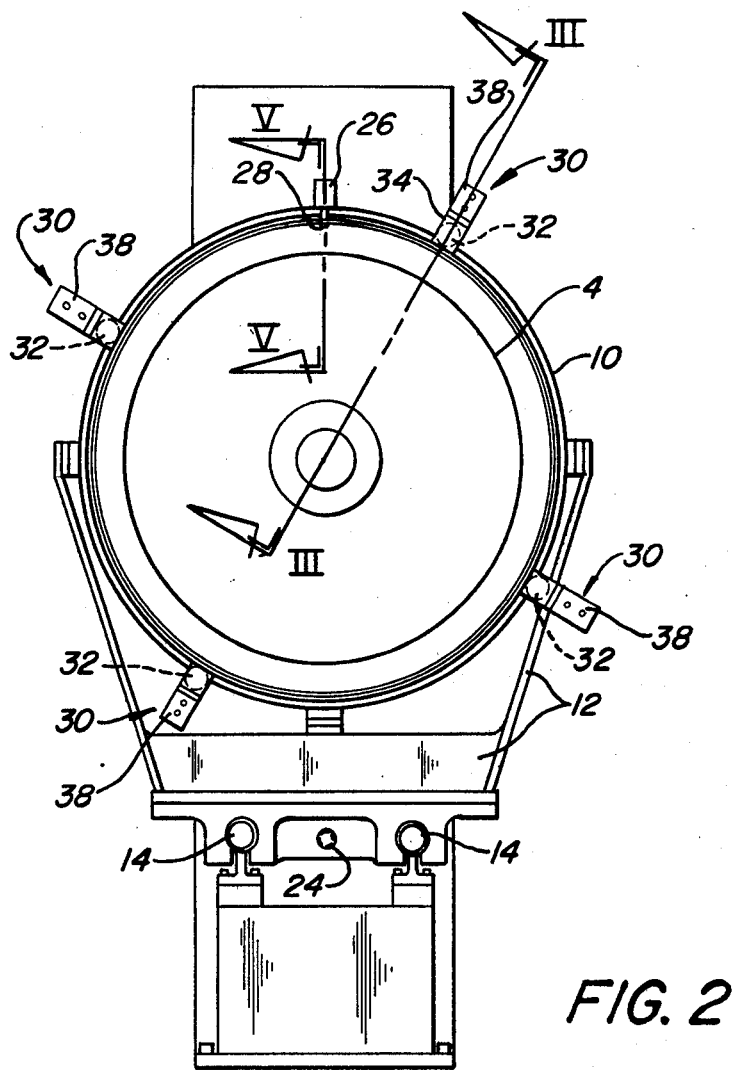
FIG. 2 is an end elevation of the bead wrapping machine of FIG. 1, taken along line II—II of FIG. 1.

The bead wrapping apparatus 2 of FIGS. 1 and 2 includes an expansible, cylindrical drum 4 mounted on a cantilever shaft 6, which is in turn mounted on a main frame and housing 8. A roll-over cylinder 10 is mounted on a carriage 12, slideable on guide rods 14. The cylinder 10 is coaxial with the drum 4 and is hollow, with an inside diameter larger than the outside diameter of the drum 4, so that the cylinder 10 can pass over the drum 4. The roll-over cylinder 10 is driven back and forth on the guide 14 by operation of a traverse motor 16, whose power shaft 18 is connected by a collar 20 to a screw 22 that rotates within a threaded ball collar 24 on the carriage 12.

An air cylinder 26 (FIGS. 1, 2 and 5) is mounted on top of the roll-over cylinder 10 at the end facing the drum 4. A retractable pin 28 hangs down from the cylinder 26 to act as a temporary support for a bead ring B. Also, as shown in FIG. 2, there are preferably four piston-operated roller units 30 spaced around the circumference of the same end of the roll-over cylinder 10. In order to allow an unobstructed view of the cylinder 26 and pin 28 in FIG. 1, the roller unit 30 closest to the cylinder 26 has been deleted in FIG. 1. Each roller unit 30 has a roller 32 rotatably held in a U-bracket 34, best seen in FIGS. 3 and 4. The U-bracket 34 is mounted on a rod 36 that is operated by an air-cylinder 38 (FIG. 2). The air-cylinder 38 is in turn mounted on a bracket 40 fixed to the edge of the roll-over cylinder 10. The four air-cylinders 38 are operated simultaneously to advance the rollers 32 inwardly against the bead ring B on the flange 28, to pick up the bead ring. Later, after the bead ring B is transferred to the drum 4, the cylinders 38 retract the rollers 32 to release the bead ring B.

Figure 3:
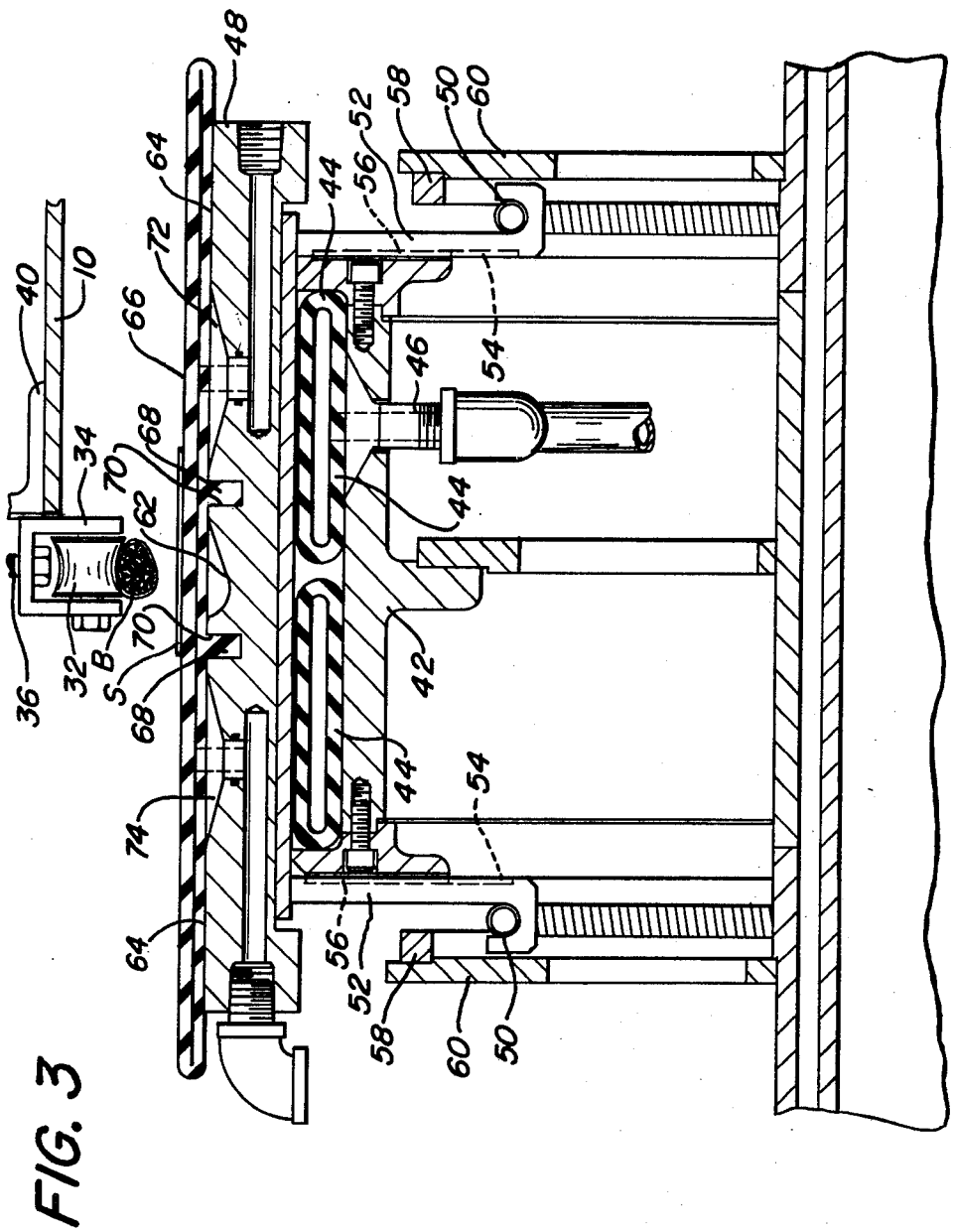

Referring to FIG. 3, the drum 4 has a stationary hub section 42 around which are mounted two bladders 44, inflatable by air supplied through fittings such as fitting 46. The hub section 42 is fixed to the shaft 6 and supports a plurality of rigid, arcuate drum segments 48 that are biased radially inwardly against the hub section 42 by circumferential springs 50 mounted on flanges 52. The flanges 52 have grooves 54 that slide within keys 56 on the hub section 42. When the bladders 44 are inflated, each segment 48 moves radially outwardly to the position shown in FIG. 4. Stops 58 on end plates 60 mounted on the shaft 6 are aligned with the flanges 52 and insure that the segments 48 are not forced outwardly beyond a set limit.

Each drum segment 48 has a recess 62 in its outer surface 64 that is shaped to accommodate the contour of the bead ring B. The recesses 62 of all the drum segments 48 are aligned to form a circumferentially extending recess around the outer surface of the drum 4.

An inflatable bladder 66 is mounted on the outer surfaces 64 of the drum segments 48 and extends over the recesses 62 in these segments. At intervals around the circumference of the drum, the bladder 66 has inward projections 68 which fit snugly into grooves 70, to prevent axial movement of the bladder 66. Also, spaced axially outward from the grooves 70 are air supply fittings 72 and 74, through which air may be introduced into the bladder 66 to inflate either side of the bladder.

In the operation of the bead wrapping apparatus 2, an operator places a bead ring B on the rollers 32 of the two lowermost roller units 30 when the rollers are in their retracted positions. The top of the bead ring B rests against the pin 28, which is in its extended position from the cylinder 26. The air cylinders 38 are then operated by a pressurized air source not shown to cause all the rollers 32 move in toward each other so that they all grip the bead ring B at the four locations shown in FIG. 2. Then, the air cylinder 26 is operated to retract the pin 28 which is no longer needed. Following that operation, the traverse motor 16 then moves the roll-over cylinder 10 over the drum 4, so that the bead ring B is held directly over the recess 62 in each drum segment 48, as shown in FIG. 3. A bead covering strip S is placed on the bladder 66 directly over the recesses 62.

Pressurized air is then introduced through fittings 46 to inflate the bladders 44, moving each drum segment 48 out to the position shown in FIG. 4. This action seats the bead ring B in the recesses 62 of the drum segments 48, with the bladder 66 and bead covering strip S being clamped between the ring B and the drum 4. In the preferred embodiment, the bladder 66 is thus formed into two independently inflatable portions 76 and 78 on either axial side of the bead ring B. With the bead ring B being securely held in the manner shown in FIG. 4, the rollers 32 are retracted by the air cylinders 38 to release the hold of the roller units 30 on the bead ring B.

The bladder 66 is then inflated and rolled in a series of steps shown in FIGS. 5 through 8 to wrap the strip S around the bead ring B. First, the right-hand bladder portion 76 is inflated by air introduced through the fitting 72, as shown in FIG. 5. The walls of the inflated chamber 76 raise the strip S around the right-hand side of the bead ring B, and then the roll-over cylinder 10, driven by traverse motor 16, moves axially in contact with the outwardly facing wall of the chamber 76, to the left as indicated by arrow a in FIG. 6. This action rolls the walls of the bladder portion 76 over the bead ring B, carrying the right-hand edge portion of the strip S over the bead ring B and pressing it against the left-hand portion of the strip S, as shown in FIG. 6.

If a flippered bead wrap is desired, the bead ring B can be considered completely wrapped and taken off the drum 4 after deflating the bladders 44 and 66. However, if the flipper F (FIG. 6) is to be wrapped against the bead ring to make a substantially round wrap, then the roll-over cylinder 10 is moved back to the right until the portion 76 is as shown in FIG. 7. The left-hand bladder portion 78 is then inflated to bring it into contact with the roll-over cylinder 10, as shown in FIG. 7. Then, the traverse motor 16 continues to move the roll-over cylinder in the direction of arrow b (FIG. 7) carrying the flipper ends F of the strip S up and over the left-hand side of the bead ring B, and simultaneously moving the wall of chamber 76 off the bead ring. While this is happening, the chamber 76 is also deflated. The rolling action of the cylinder 10 in the direction of arrow b finally brings the chamber 78 to position shown in FIG. 8, with the bead ring B completely wrapped in the strip S and the flippered ends F of the strip S pressed tight against the outer surface of the strip to make a substantially round wrap. With this accomplished, the chamber 78 is deflated, the roll-over cylinder 10 is moved back to its position shown in FIG. 1, and the drum 4 is collapsed by deflating the bladders 44. The wrapped bead ring B may then be removed from the drum 4 by hand.

It should be noted that throughout the entire wrapping operation, the only parts contacting the bead ring B, other than the inside surface of the covering strip S, are the rollers 32 and the small pin 28 on the bead ring support 26. Because neither of these parts contacts the outside surface of the bead ring after it is wrapped, or any other parts of the apparatus that would enable a lubricant to be transmitted to covered bead rings, lubricated bead rings can be wrapped with a cover that is dry on the outside. Also, because each edge portion of the wrap is folded around the ring with all circumferential sections being folded simultaneously rather than being moved through circumferentially spaced stations, the bead rings can be held better from movement with respect to the covering strip while it is being wrapped, resulting in a more uniform wrap.

While several embodiments of the present invention have been shown and described, other embodiments, modifications and additions will be apparent to those skilled in the art, without departing from the scope of the appended claims.

What is claimed is:

1. A method of wrapping a bead ring comprising the steps of:
    (a) placing a bead covering strip on a deflated bladder that extends across a circumferentially extending recess in the surface of an expansible drum, so that said bead covering strip extends around said drum and said bladder extends over said recess;
    (b) radially expanding said drum to receive said bead ring in said recess, with said bead covering strip and said bladder being interposed between said bead ring and said drum;
    (c) inflating said bladder on one lateral side of said bead ring to raise a first edge portion of said covering strip, and rolling an outwardly facing wall of said bladder axially to carry said bladder over said bead ring and wrap said first edge portion of said strip over the radially outwardly facing side of said bead ring and press said first edge portion against the other edge portion of said strip on the opposite lateral side of said bead ring;
    (d) inflating the portion of said bladder on the opposite lateral side of said bead ring from the side inflated in step (c) to raise the other edge portion of said covering strip, and rolling the outwardly facing wall of said bladder portion in the opposite direction from the direction of said rolling in step (c) so that said bladder wraps both of said edge portions of said covering strip over the radially outwardly facing side of said bead ring; and
    (e) while rolling the outwardly facing wall of said bladder portion in said opposite direction, deflating said bladder on the first mentioned lateral side of said bead ring to release the outwardly facing wall of said bladder on said first mentioned lateral side from contact with said bead covering strip, and then continuing to roll said outwardly facing wall of said bladder portion in said opposite direction to press the edge portions of said covering strip tight against the outer surface of said strip.

* * * * *